United States Patent [19]

Pitel

[11] Patent Number: 4,574,223
[45] Date of Patent: Mar. 4, 1986

[54] FAST WARMUP BALLAST FOR HID LAMPS

[75] Inventor: Ira J. Pitel, Morristown, N.J.

[73] Assignee: HID Systems, Inc., Sparta, N.J.

[21] Appl. No.: 570,111

[22] Filed: Jan. 12, 1984

[51] Int. Cl.$^4$ .................. H05B 41/14; H05B 41/36
[52] U.S. Cl. .................................. 315/307; 315/311;
315/54; 315/284; 323/258
[58] Field of Search ............... 315/307, 311, DIG. 7,
315/247, 284, 54, 50; 323/255, 258, 311, 312

[56] References Cited

U.S. PATENT DOCUMENTS

| | | | |
|---|---|---|---|
| 2,875,379 | 2/1959 | Porter | 315/106 |
| 3,319,153 | 5/1967 | Livingston | 323/258 |
| 3,384,807 | 5/1968 | Klein et al. | 323/224 |
| 3,479,559 | 11/1969 | Paget | 315/105 |
| 3,486,070 | 12/1969 | Engel | 315/225 |
| 3,778,699 | 12/1973 | Hoffman | 323/248 |
| 3,931,544 | 1/1976 | Pitel | 315/273 |
| 3,944,876 | 3/1976 | Helmuth | 315/205 |
| 4,162,429 | 7/1979 | Elms et al. | 315/311 X |
| 4,220,911 | 9/1980 | Rosa | 323/258 X |
| 4,337,417 | 6/1982 | Johnson | 315/290 |
| 4,356,433 | 10/1982 | Linden | 315/DIG. 7 X |

FOREIGN PATENT DOCUMENTS

| | | | |
|---|---|---|---|
| 2814403 | 10/1979 | Fed. Rep. of Germany | 315/311 |
| 2426382 | 1/1980 | France | 315/284 |
| 752273 | 9/1980 | U.S.S.R. | 323/255 |

Primary Examiner—David K. Moore
Assistant Examiner—Vincent DeLuca

[57] ABSTRACT

A lag ballast for a high intensity discharge lamp includes a transformer providing voltage at either of two levels. Triacs tied to the transformer supply current at the desired voltage level through either of two inductances. The triacs are controlled by a comparison circuit so that a low voltage and high current are supplied to the lamp during startup and a lower current and higher voltage are supplied as the lamp approaches its normal operating temperature.

16 Claims, 2 Drawing Figures

FAST WARMUP BALLAST FOR HID LAMPS

BACKGROUND OF THE INVENTION

The present invention relates to ballasts for use with high intensity discharge lamps.

High intensity discharge lamps have two characteristics which require the use of a ballast in connection with them. First, they have a negative resistance characteristic such that they will tend to draw excessive current and self-destruct unless a ballasting mechanism is provided. Second, they operate most efficiently at an elevated temperature and require a warmup period between startup and reaching full intensity and ballasts are used to supply sufficient current to the lamp at startup to reach the elevated temperature.

Numerous attempts have been made to reduce the startup time period, with varying results. One prior attempt is shown in U.S. Pat. No. 3,931,544 to Pitel and another is shown in U.S. Pat. No. 3,944,876 to Helmuth. The Pitel apparatus relies upon an electronic circuit to ballast the lamp. The Helmuth apparatus relies on inductive components to ballast, but in the startup phase parallels those inductive components with additional inductive components to supply additional current to the lamp. This leads to the generation of circulating currents between the inductors and requires the addition of power factor correction components. These additional components add to the cost of the ballast by requiring expenditures not only for the components themselves, but also for labor to assemble and service them.

Accordingly, there is a need in the art for a ballast circuit for high intensity discharge lamps which will facilitate rapid lamp startup requiring little or no power factor correction components.

SUMMARY OF THE INVENTION

The present invention fulfills this need by providing a fast warmup ballast for a high intensity discharge lamp including a transformer having two input taps adapted for connection to an a.c. power source and two output taps. A first switch means has an input tied to one of the output taps, and a second switch means has an input tied to the other of the output taps. A first inductance ties the outputs of the first and second switch means, and a second inductance and a lamp connection serially tie the output of the second switch means and one of the input taps of the transformer. A means is provided for alternatively closing one or the other of the switch means in response to comparison of an operating characteristic of the lamp to a reference, such that during lamp warmup a high current is supplied through the second switch means and after warmup a high voltage is supplied through the first switch means. Preferably, the first and second inductances are provided in the form of a multitap inductor.

In a preferred embodiment, the transformer is an autotransformer, one of the transformer input taps is connected to one end of the transformer, the other input tap is a first intermediate tap, one of the output taps is connected to the other end of the transformer, and the other output tap is a second intermediate tap, between the input taps. In such an autotransformer the number of windings between the end input tap and the second intermediate tap is preferably about 70% of the number of windings in the transformer.

Preferably, the multitap inductor tap adapted for connection through the lamp is an end tap and the number of windings between it and the tap to one of the switch means is about 240% of the number of windings between the two taps to the switch means.

Typically, each of the switch means is a triac having a gate and acts as a closed switch upon receiving an input signal to its gate. The means for alternatively closing one or the other of the switch means includes means for generating the reference, means for sampling the lamp voltage, and means for comparing the sampled lamp voltage and the reference and providing a signal to the gate of one triac when the lamp voltage exceeds the reference and an output signal to the gate of the other triac when the reference exceeds the lamp voltage.

BRIEF DESCRIPTION OF THE DRAWINGS

The invention will be better understood after a study of the drawings in connection with the detailed description of the preferred embodiment which follows. In the drawings.

DETAILED DESCRIPTION OF THE PREFERRED EMBODIMENT

Figure 1:
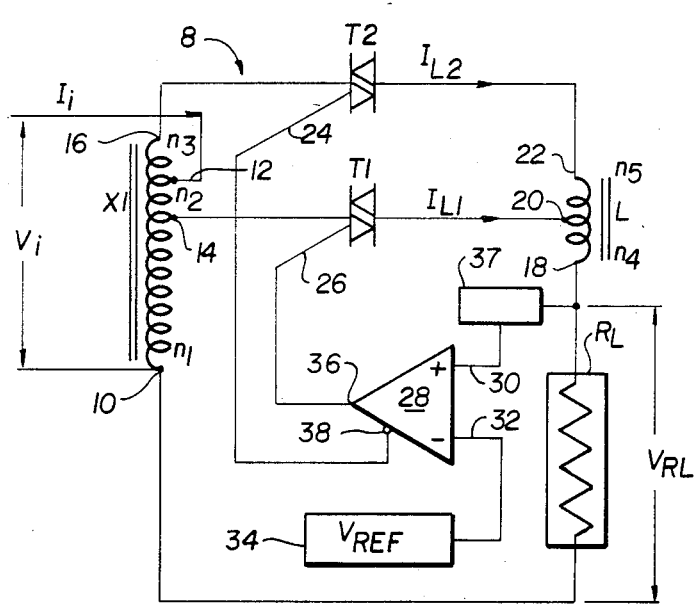
FIG. 1 is a schematic diagram of a preferred embodiment of the invention.

As seen in FIG. 1, a HID lamp is represented by a resistive load element $R_L$. In a typical circuit the lamp will be mounted in a fixture and when so mounted forms a part of the ballast circuit 8. Various HID lamp types are known including mercury vapor, sodium vapor, metal halide and the like, and the present invention is suitable for use with each. The lamp begins to conduct when a sufficiently high voltage is placed across it. The resistance of the lamp varies with its temperature, generally increasing with increasing temperature. Thus, when the arc in the lamp is initially struck, the value of $R_L$ is at a minimum and gradually increases to a maximum as the lamp reaches operating temperature.

The ballast circuit 8 is supplied from a conventional AC power source at a voltage $V_i$. It will be understood that $V_i$ can be any suitable HID lamp power source such as 120, 208, 240, 277 or 480 VAC. The line voltage is applied to the primary of a transformer X1 having input taps 10 and 12 and output taps 14 and 16. Preferably, X1 is an autotransformer, although other transformer types could be used. Autotransformer X1 has a single coil with the four taps.

Input tap 10 is connected to one side of the lamp $R_L$ while the other side of the lamp is connected to tap 18 of multitap inductor L. As will be apparent to those of ordinary skill, two separate inductors could be used in place of a single multitap inductor. Multitap inductor L has three taps 18, 20, and 22 such that either one of taps 20 or 22 can be a source of current through tap 18 and lamp $R_L$.

Output tap 16 of autotransformer X1 is tied to tap 22 of inductor L through triac T2, which is a bidirectional semiconductor switch. It can be considered a normally open switch which is closed when a current pulse is received on its gate 24. Thus, upon receipt of a current pulse in gate 24 of triac T2, output tap 16 of autotransformer X1 and tap 22 of inductor L can be considered connected by a short circuit.

Similarly, tap 14 of autotransformer X1 and tap 20 of inductor L are connected through triac T1. When triac T1 is turned on by a pulse to its gate 26, taps 14 and 20 can be considered as connected by a short circuit.

The choice of which of the triacs T1 or T2 is on is made by a comparison circuit. The comparison circuit includes comparator 28 which has inputs 30 and 32. Input 32 receives a reference voltage level $V_{REF}$ from reference voltage generator 34, and input 30 samples the voltage $V_{RL}$ across the lamp. The relative values of $V_{RL}$ and $V_{REF}$ are compared in comparator 28. If $V_{RL}$ is less than $V_{REF}$, a signal appears at output 36, gating triac T1 and creating a short circuit between taps 14 and 20. No signal appears on output 38, so triac T2 serves as an open switch.

If $V_{RL}$ exceeds $V_{REF}$, no signal appears at output 36, but one does appear at output 38, gating triac T2. Thus, taps 14 and 20 are separated by an open circuit, and taps 16 and 22 are connected by a short circuit.

Numerous ways to carry out the logic functions determining which of triacs T1 or T2 is gated will be apparent to those of ordinary skill in the art. In one particular embodiment, the lamp voltage $V_{RL}$ may be rectified and averaged in filter 37 such that the signal appearing at input 30 is a d.c. voltage corresponding to the actual lamp voltage, and the reference voltage generator 34 may generate a d.c. voltage corresponding to a $V_{REF}$ at which transition from T1 conducting to T2 conducting is desired. The outputs 36 and 38 of comparator 28 may be converted to a pulse wave shape to gate their respective triacs. These techniques are well known to those of ordinary skill in the art.

In operation, a typical input voltage $V_i = 120$ VAC will initially be stepped up through transformer X1 conducting through T2 to strike the lamp into conduction. This will be the case because in the non-conducting situation $V_{RL}$ will be greater $V_{REF}$. However, once conduction has begun, the cold lamp will have a low resistance so that $V_{RL}$ will be low, less than $V_{REF}$. Thus, comparator 28 will apply an output signal to gate 26 of triac T1. The number of turns of inductor L through which current from T1 must pass is relatively small, so the impedance is low and a relatively high current is applied to the lamp. The high level current will heat the lamp to its operating level quickly. As the lamp increases in temperature, its resistance increases, ultimately to the point where $V_{RL}$ exceeds $V_{REF}$. At this point the signal at output 36 to gate 26 is discontinued, and a signal appears at output 38 to gate 24 of triac T2. In this arrangement a higher voltage, but lower current level is applied to the lamp as it reaches operating temperature and functions at its maximum efficiency. As will be apparent, the lamp current is always restricted to a single loop, so that even though multiple inductive elements are included in the ballast circuit 8, no circulating currents which would diminish the power factor are generated. Thus power factor correction capacitors and the like can be substantially reduced or eliminated.

The selection of tap locations for transformer X1 and inductor L may be determined from the following analysis:

When triac T1 is conducting, inductor L has a value $L_l$. The impedance of the lamp circuit is given by $$Z_1 = R_{L1} + jwL_1$$

where $R_{L1}$ is the resistance of the lamp during the period when triac T1 is conducting; j is the square root of $-1$; and w is the angular frequency of the input signal, $2\pi$ times the frequency, which is typically 50 or 60 Hz. The input impedance of the circuit when T1 is conducting is $$Z_{il} = N_1^2(R_{L1} + jwL_1)$$

where $N_1$ is $n_1 + n_2$, the number of windings between taps 10 and 12, divided by $n_1$, the number of windings between taps 10 and 14. The apparent power input is $$P_{il} = V_i I_{il}^* = P_1 + jQ_1,$$

where $I_{il}^*$ is the input current, $P_1$ is the real average power input and $Q1$ is the reactive power input when T1 is conducting. Thus, $$P_{il} = V_i \left[ \frac{V_i}{N_1^2(R_{L1} + jwL_1)} \right]^* =$$

$$\frac{V_i^2}{N_1^2} \frac{R_{L1}}{R_{L1}^2 + (wL_1)^2} + \frac{V_i^2}{N_1^2} \frac{jwL_1}{R_{L1}^2 + (wL_1)^2}$$

Using similar notation, when triac T2 is conducting the apparent power input is $$P_{i2} = \frac{V_i^2}{N_2^2} \frac{R_{L2}}{R_{L2}^2 + (wL_2)^2} + \frac{V_i^2}{N_2^2} \frac{jwL_2}{R_{L2}^2 + (wL_2)^2}.$$

$N_2$ is $n_1 + n_2$ the number of windings between taps 10 and 12 divided by $n_1 + n_2 + n_3$, the number of windings between taps 10 and 16, $R_{L2}$ is the resistance of the lamp when triac T2 is conducting, and $L_2$ is the inductance of inductor L when triac T2 is conducting.

One point at which it is desirable to switch from T1 conducting to T2 conducting is when $Q_1 = Q_2$, with $R_{L1} = wL_1, R_{L2} = wL_2$, and $R_{L1} = 0.5 R_{L2}$. Thus, $$\frac{V_i^2}{N_1^2} \frac{jwL_1}{R_{L1}^2 + (wL_1)^2} = \frac{V_i^2}{N_2^2} \frac{jwL_2}{R_{L2}^2 + (wL_2)^2}$$

Rearranging terms, $$\frac{N_2^2}{N_1^2} = \frac{L_2}{L_1} \frac{R_{L1}^2 + (wL_1)^2}{R_{L2}^2 + (wL_2)^2} = \frac{R_{L1}}{R_{L2}}$$

$$\left[ \frac{n_1}{n_1 + n_2 + n_3} \right] = \frac{R_{L1}}{R_{L2}} = .5$$

$$n_1 = \sqrt{.5} \ (n_1 + n_2 + n_3)$$

$$n_1 \approx 70\% \ (n_1 + n_2 + n_3)$$

Figure 2:
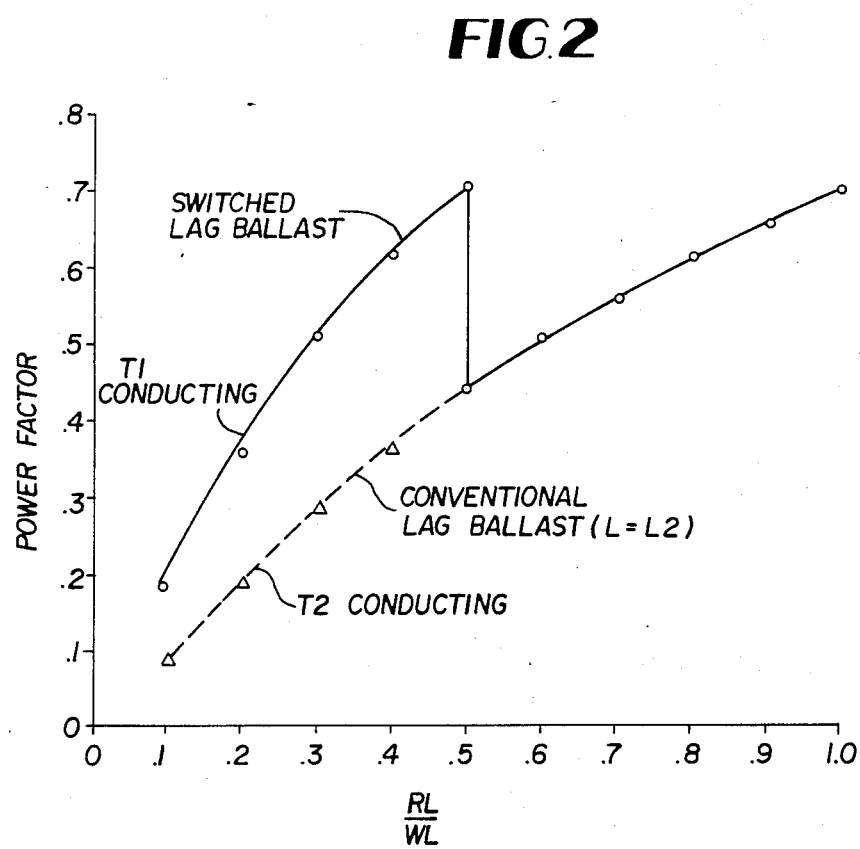
FIG. 2 is a graphical depiction of the circuit power factor as it varies with lamp resistance.

FIG. 2 shows how the power factor varies with the lamp resistance ($R_L/wL$), both in the preferred embodiment and in a conventional lag ballast. The conventional lag ballast has a continuously increasing power factor, but the increase is at a modest rate. (In the present invention this corresponds to triac T2 conducting during startup.) When T1 conducts during startup, the power factor starts at a higher level and increases more quickly. In the data shown in FIG. 2, when $R_L = 0.5$ wL, comparator 28 reverses its output and triac T2 takes over.

Having the initial conduction through T1 not only increases the power factor, but also increases the lamp current so it reaches operating temperature quickly. This can be seen from the following analysis:

$$|I_{L1}| = \frac{V_i}{N_1} \frac{1}{\sqrt{R_{L1}^2 + (wL_2)^2}} = \text{lamp current when } T1 \text{ conducts}$$

$$|I_{L2}| = \frac{V_1}{N_2} \frac{1}{\sqrt{R_{L2}^2 + (wL_2)^2}} = \text{lamp current when } T2 \text{ conducts}$$

$$\frac{|I_{L1}|}{|I_{L2}|} = \frac{N_2}{N_1} \frac{\sqrt{R_{L2}^2 + (wL_2)^2}}{\sqrt{R_{L1}^2 + (wL_1)^2}}$$

As noted above, $$\frac{N_2}{N_1} = .707 \text{ and } wL_2 = R_{L2}.$$

For $R_{L1} = 0.1 R_{L2\ max}$ and $wL_1 = 0.5\ R_{L2\ max}$ $$\frac{|I_{L1}|}{|I_{L2}|} = 1.96.$$

For a conventional lag ballast $$\frac{N_2}{N_1} = 1$$

$R_{L1} = 0.1 R_{L2\ max}$ and
$wL_1 = wL_2 = R_{L2\ max}$, so $$R_{L1} = .1 R_{L2\ max} \text{ and}$$
$$wL_1 = wL_2 = R_{L2\ max}, \text{ so}$$

$$\frac{|I_{L1}|}{|I_{L2}|} = 1.40.$$

Thus the starting current is some 40% higher than in conventional ballasts, providing faster lamp warmup. Typically a lamp reaches full intensity in 45 seconds, compared to the several minute wait required when conventional ballasts are used. This is made possible with a minimum of components and with higher power factor, so power factor correction can be substantially reduced or eliminated The condition $wL_1 = 0.5 R_{L2}$ max is satisfied along with the condition $wL_2 = R_{L2}$ max, if the number of windings n4 between end tap 18 and tap 20 of inductor L is about 240% of the number of windings n5 between taps 20 and 22.

In the preferred embodiment, the autotransformer and multitap inductor can be constructed on a common core with magnetic shunts placed between the two coils.

I claim:

1. A fast warmup ballast for a high intensity discharge lamp comprising:
   a transformer having two input taps adapted for connection to an a.c. power source and two output taps,
   a first switch means having an input tied to one of said output taps and a second switch means having an input tied to the other of said output taps,
   a first inductance tying outputs of said first and second switch means,
   a second inductance and a lamp connection serially tying the output of said first switch means and one of said input taps of said transformer,
   means for alternatively closing one or the other of said switch means in response to comparison of an operating characteristic of the lamp to a reference, whereby during lamp warmup a high current is supplied through said first switch means and after warmup a high voltage is supplied through said second switch means.

2. A fast warmup ballast for a high intensity discharge lamp comprising
   a transformer having two input taps adapted for connection to an a.c. power source and two output taps,
   a multitap inductor having one tap adapted for connection through a lamp to one of said input taps of said transformer and two other taps each connected through one of two selectively operable switch means to one of said two output taps of said transformer, and
   means for alternatively closing one or the other of said switch means in response to comparison of an operating characteristic of the lamp to a reference, whereby during lamp warmup a high current is supplied to the lamp through one of said switch means, and after warmup a high voltage is supplied through the other of said switch means.

3. A ballast as claimed in claim 2 wherein said transformer is an autotransformer, one of said transformer input taps is connected to one end of said transformer, the other input tap is a first intermediate tap, one of said output taps is connected to the other end of said transformer and the other output tap is a second intermediate tap, between said input taps.

4. A ballast as claimed in claim 3 wherein in said transformer the number of windings between said end input tap and said second intermediate tap is about 70% of the number of windings in said transformer.

5. A ballast as claimed in claim 4 wherein in said multitap inductor the tap adapted for connection through the lamp is an end tap and the number of windings between said end tap and the tap to one of the switch means is about 240% of the number of windings between the two taps to the switch means.

6. A ballast as claimed in claim 5 wherein each of said switch means is a triac having a gate and acts as a closed switch upon receiving an input signal to its gate.

7. A ballast as claimed in claim 6 wherein said means for alternatively closing one or the other of said switch means includes means for generating the reference, means for sampling the lamp voltage, and means for comparing the sampled lamp voltage and the reference and providing a signal to the gate of one triac when the lamp voltage exceeds the reference and an output signal to the gate of the other triac when the reference exceeds the lamp voltage.

8. A ballast as claimed in claim 2 wherein in said multitap inductor the tap adapted for connection through the lamp is an end tap and the number of windings between said end tap and the tap to one of the switch means is about 240% of the number of windings between the two taps to the switch means.

9. A ballast as claimed in claim 8 wherein said means for alternatively closing one or the other of said switch means includes means for generating the reference, means for sampling the lamp voltage, and means for comparing the sampled lamp voltage and the reference and for closing one of the switch means when the lamp voltage exceeds the reference and closing the other switch means when the reference exceeds the lamp voltage.

10. A ballast as claimed in claim 9 wherein said transformer is an autotransformer, and one of said transformer input taps is connected to one end of said transformer, the other input tap is a first intermediate tap, one of said output taps is connected to the other end of said transformer and the other output tap is a second intermediate tap, between said input taps.

11. A ballast as claimed in claim 10 wherein each of said switch means is a triac having a gate and acts as a closed switch upon receiving an input signal to its gate.

12. A ballast as claimed in claim 11 wherein in said transformer the number of windings between said end input tap and said second intermediate tap is about 70% of the number of windings in said transformer.

13. A ballast as claimed in claim 2 wherein said means for alternatively closing one or the other of said switch means includes means for generating the reference, means for sampling the lamp voltage, and means for comparing the sampled lamp voltage and the reference and for closing one of the switch means when the lamp voltage exceeds the reference and closing the other switch means when the reference exceeds the lamp voltage.

14. A ballast as claimed in claim 13 wherein said transformer is an autotransformer, one of said transformer input taps is connected to one end of said transformer, the other input tap is a first intermediate tap, one of said output taps is connected to the other end of said transformer and the other output tap is a second intermediate tap, between said input taps.

15. A ballast as claimed in claim 14 wherein in said transformer the number of windings between said end input tap and said second intermediate tap is about 70% of the number of windings in said transformer.

16. A ballast as claimed in claim 15 wherein each of said switch means is a triac having a gate and serves as a closed switch upon receiving an input signal to its gate.

* * * * *